3,065,123
PROCESS FOR CONTROL OF MICRO-ORGANISMS
Anthony John Hinton, Blackley, Manchester, John Selwyn Morley, Alderley Park, Macclesfield, and John Norman Turner, Bracknell, England, assignors to Imperial Chemical Industries Limited, London, England, a corporation of Great Britain
No Drawing. Filed June 6, 1960, Ser. No. 33,917
Claims priority, application Great Britain June 24, 1959
11 Claims. (Cl. 162—161)

This invention relates to a process for the control of micro-organisms, and more particularly to the control of micro-organisms in water and aqueous media by the addition of certain 1:2-benzisothiazolones.

Water and aqueous media are susceptible to infection by micro-organisms, and the efficiency of circulating systems containing such aqueous media is frequently impaired by deposits of bacterial or fungal origin, particularly when the aqueous media contains cellulosic materials or other nutrients. The control of these infections is of importance, for example, in the manufacture of paper, particularly when the water used for the production of pulp is recycled and the degree of infection will rapidly increase if not controlled. These micro-organisms produce a mud or slime which coats the walls of the tanks and other vessels used, blocks pipes, and causes imperfections such as discolouration, and thin spots in the paper, and results in loss of production owing to breaks during paper manufacture.

It has been proposed to control these micro-organisms by the addition to the aqueous media of certain organic compounds containing mercury, for example phenyl mercuric acetate, and methoxy and ethoxy mercuric chlorides and acetates. These compounds, however, suffer from the serious disadvantage of being highly toxic to humans and therefore hazardous and expensive not only to use but to manufacture, transport, and store. Furthermore, these compounds cannot be employed in the manufacture of paper intended for use in foodstuff wrappers, hygienic paper, and the like. Other compounds such as sodium pentachlorophenate and sodium orthophenylphenate have been used when the presence of mercury-containing compounds cannot be tolerated, but these compounds are less effective than the organic mercury compounds.

It has now been found that certain 1:2-benzisothiazolones which are relatively non-toxic to humans are very effective agents for the control of these micro-organisms.

According to the invention, therefore, there is provided a process for the protection of aqueous media against infection by micro-organisms which comprises the addition to the aqueous media of a 1:2-benzisothiazolone of the formula:

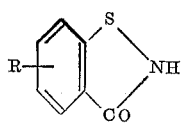

wherein R stands for a hydrogen or halogen atom, or a salt of such a 1:2-benzisothiazolone.

As examples of halogen atoms which may be represented by R there may be mentioned chlorine and bromine, and as examples of salts of 1:2-benzisothiazolones which may be used in the process of the invention there may be mentioned salts with metals such as sodium or potassium, or with ammonia or amines such as triethanolamine.

As examples of 1:2-benzisothiazolones which may be used as free compounds or as salts in the process of our invention there may be mentioned 5-chloro-1:2-benzisothiazolone, 5-bromo-1:2-benzisothiazolone, but it is preferred to use 1:2-benzisothiazolone itself as this compound is a more powerful agent for the control of these micro-organisms.

The process of the invention is applicable to many systems containing aqueous media, for example water-storage and water-cooling systems, but is of especial value in the treatment of aqueous media containing mineral salts or other inorganic compounds, or organic materials such as carbohydrates including cellulosic substances, proteins or protein degradation products, for example mechanical or chemical wood pulps, pulps of esparto, straw, cotton, hemp, jute, sisal, flax, and bamboo, natural or synthetic rubber latices, water-paints, adhesives, cutting fluids, and tannery soak liquors.

The 1:2-benzisothiazolone used in the process of the invention may be added to the aqueous media in any convenient manner, but preferably in the form of an aqueous suspension or as a dispersible powder, which may be obtained readily by mixing the benzisothiazolone in finely divided form with dispersing and wetting agents such as alkylated naphthalene sulphonic acids. Alternatively, it may be added as a solution in an organic solvent such as diethylene glycol or, if desired, as an aqueous solution of a salt, which may be obtained for example in the case of the sodium salt by adding the 1:2-benzisothiazolone to aqueous sodium hydroxide solution. Concentrations of 1:2-benzisothiazolone of between 2 p.p.m. and 10 p.p.m. on the weight of water are preferred, but the actual concentration needed to prevent microbial growth varies greatly with the conditions prevailing, such as content of nutrients, pH, and operating temperature, and in some circumstances lower concentrations will be adequate and in others higher concentrations will be necessary.

The process of the invention is of particular value in the manufacture of paper, the 1:2-benzisothiazolone being added to the pulp in the beater, stock chest, mixing box, backwater tanks, savealls, or at any other convenient stage in the paper manufacturing process.

The 1:2-benzisothiazolones are powerful agents for the control of micro-organisms in aqueous suspensions of cellulosic material and compare favourably with the hitherto used organic mercury compounds and, apart from the advantages associated with their non-toxic nature, also possess the important property of low affinity for cellulosic material. They are, therefore, removed only slowly from the aqueous cellulosic suspensions with the result that the controlling effect is prolonged and less agent need be added subsequently to maintain an effective concentration. The organic mercury compounds, however, have a higher affinity for cellulose and are rapidly deactivated in aqueous cellulose suspension.

The invention is illustrated but not limited by the following examples in which parts are by weight unless otherwise stated:

EXAMPLE 1

The antifungal and antibacterial activities of 1:2-benzisothiazolone, the sodium salt of 1:2-benzisothiazolone, 5-chloro-1:2-benzisothiazolone, and sodium pentachlorophenate are compared in the following manner.

Malt agar plates are prepared containing 3.2, 16, 80 and 400 parts per million of above agents and are inoculated with the fungi listed in Table 1, and incubated at 25° C. Similar tests are carried out in bacteriological agar containing 3.2, 16, 80 and 400 parts per million of the agents and inoculated with the bacteria listed in Table 1. Table 1 gives the minimum concentration of agent required to inhibit growth completely.

*Table 1*

| Agent | P.p.m. agent |||||||||
|---|---|---|---|---|---|---|---|---|---|
| | Fungi |||||| Bacteria |||
| | Phoma pigmentivora | Nemnoniella echinata | Ceratocystis pilifera | Polystictus versicolor | Oospora lactis | Penicillium notatum | Bacillus subtilis | Staphylococcus aureus | Pseudomonas aerugenosa | Escherichia coli |
| 1:2-benzisothiazolone | 80 | 80 | 80 | 16 | 16 | 400 | 3.2 | 3.2 | 16 | 16 |
| Sodium salt of 1:2-benzisothiazolone | 16 | 16 | 16 | 16 | 16 | >400 | 3.2 | 16 | 16 | 16 |
| 5-chloro-1:2-benzisothiazolone | 16 | 80 | 16 | 16 | 80 | 80 | 80 | 3.2 | >400 | 80 |
| Sodium pentachlorophenate | 80 | | 80 | 80 | 80 | 80 | 80 | 80 | 400 | 400 |

It is clear that the 1:2-benzisothiazolones are much more active than sodium pentachlorophenate, particularly against the gram-negative bacteria which are the most common causes of slime formation.

EXAMPLE 2

A dilute aqueous suspension of cellulosic fibres prepared from a newsprint stock fortified with bacterial nutrients is circulated by sterile compressed air in a closed glass system at 20° C. The progress of infection by micro-organisms is followed by measurement of the pH at daily intervals and by observation of the appearance of the suspension. Comparative experiments are carried out with suspensions containing respectively no agent, 6 parts per million of phenyl mercuric acetate, and 6 parts per million of 1:2-benzisothiazolone. Table 2 shows the daily changes in pH and, since a decrease in pH is associated with increase in degree of bacterial infection, demonstrates the more persistent activity of 1:2-benzisothiazolone compared with phenyl mercuric acetate.

*Table 2*

| Time (hour) | pH of stock |||
|---|---|---|---|
| | Untreated | 6 p.p.m. phenyl mercuric acetate | 6 p.p.m. 1:2-benzisothiazolone |
| 0 | 6.4 | 6.4 | 6.4 |
| 24 | 6.2 | 6.2 | 6.4 |
| 48 | 6.1 | 5.7 | 6.4 |
| 72 | 4.4 | 5.0 | 6.0 |
| 96 | 4.5 | 4.8 | 5.0 |

The suspension containing no agent becomes turbid and thick with slime after 24 hours, that containing phenyl mercuric acetate becomes moderately turbid after 24 hours, and that containing 1:2-benzthiazolone becomes moderately turbid only after 72 hours.

EXAMPLE 3

A dilute aqueous suspension of cellulosic fibres prepared from a newsprint stock is inoculated with *Aerobacter aerogenes* and circulated by sterile compressed air in a closed glass system at 20° C. Comparative experiments are carried out with suspensions containing respectively no agent, 4 parts per million of phenyl mercuric acetate, and 8 parts per million of 1:2-benzisothiazolone, the progress of infection being followed by bacterial counts made on samples after various time. Table 3 gives the bacterial counts in terms of the logarithm of the number of organisms per ml. after each time interval, and shows clearly the superior activity of 1:2-benzisothiazolone.

*Table 3*

| Time (hour) | Log. Organisms per ml. |||
|---|---|---|---|
| | Untreated | 4 p.p.m. phenyl mercuric acetate | 8 p.p.m. 1:2-benzisothiazolone |
| 0 | 6.30 | 6.56 | 6.33 |
| 3 | 6.27 | 6.23 | 6.53 |
| 24 | 8.36 | 7.16 | 6.50 |
| 48 | 11.07 | 9.65 | 7.53 |
| 96 | 10.62 | 10.28 | 9.72 |

EXAMPLE 4

A dilute aqueous solution of glucose and peptone is inoculated with *Aerobacter aerogenes* and circulated by sterile compressed air in a closed glass system at 20–25° C., in the presence of cellulosic fibre from newsprint stock, the circulation of which is prevented by a gauze of polyester fibre. Comparative experiments are carried out with suspensions containing respectively no agent, 8 parts per million of the sodium salt of 1:2-benzisothiazolone, and 8 parts per million of 1:2-benzisothiazolone. Circulation is continued for 96 hours and then a measured proportion of the liquors free from cellulosic fibres is taken and centrifuged to isolate the bacterial cells. These cells are thoroughly washed with water on the centrifuge, and then hydrolysed by acid. The sugar thus produced is determined by the colorimetric method based on the anthrone reaction and described by B. K. Goss, Journal of the Association of Official Agricultural Chemists, 1954, vol. 37, page 287. The amount of sugar obtained in each experiment is proportional to the amount of slime produced (as bacterial polysaccharide) and is given in Table 4, the amount of sugar being expressed in terms of mg. per litre of circulating liquor.

Two samples of the liquors are taken in each case the results on each being given under columns *a* and *b* respectively.

*Table 4*

| | Untreated || 8 p.p.m. 1:2-benzisothiazolone, sodium salt || 8 p.p.m. 1:2-benzisothiazolone ||
|---|---|---|---|---|---|---|
| | a | b | a | b | a | b |
| Sugar | 100 | 125 | <12 | <12 | 12 | 50 |

EXAMPLE 5

The efficacy of 1:2-benzisothiazolone in inhibiting the growth of micro-organisms in different aqueous media is demonstrated as follows:

Rubber latices, protein-stabilised water paints, waters used for soaking back dried hides and skins, and water as used in water-cooling systems are incubated at optimum growth temperature (between 25° and 30° C.) after being heavily inoculated with cultures of the organisms typically responsible for their deterioration and spoilage. The minimum quantities of 1:2-benzisothiazolone preventing growth of these microorganisms over a period of storage such as would be met in practical usage are determined. Table 5 gives details of the results obtained. It will be seen that in two cases control has been achieved against Pseudomonas, a common organism resistant to many commercial bactericides.

*Table 5*

CONCENTRATIONS PREVENTING GROWTH OR SPOILAGE IN LABORATORY INCUBATION AT 25–30° C.

| Sugstrate, inoculum | Rubber latex, Aerobacter aerogenes | Synthetic latex, Aerobacter aerogenes, Echerichia coli | Tannery soak liquor, natural skin flora (including Pseudomonas) | Water paint, Pseudomonas aeruginosa | Cooling water (algal) Chlorella vulgaris, Scenedesmus obliquus, Ulothrix subtilissima |
|---|---|---|---|---|---|
| Days' storage | 200 | 30 | 5 | 100 | 30 |
| Benzisothiazolone, p.p.m. | 200 | 10 | 40 | 1,000 | 1.5 |

What we claim is:

1. A process for the protection of aqueous media against infection by micro-organisms which comprises adding to the aqueous media a compound selected from the group consisting of a 1:2-benzisothiazolone of the formula:

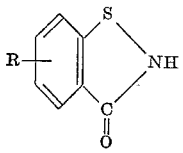

wherein R is selected from the group consisting of hydrogen and halogen, and water-soluble salts thereof.

2. A process as claimed in claim 1 wherein R stands for hydrogen.

3. A process as claimed in claim 1 wherein the 1:2-benzisothiazolone is used in the form of a dispersion.

4. A process as claimed in claim 1 wherein the 1:2-benzisothiazolone is used in the form of a water-soluble salt with a member of the group consisting of metal, ammonia and amine.

5. A process as claimed in claim 1 wherein the aqueous media contains carbohydrates.

6. A process as claimed in claim 5 wherein the aqueous media contains cellulosic material.

7. A process as claimed in claim 1 wherein the aqueous media contains a substance selected from the group consisting of protein and protein degradation products.

8. A process as claimed in claim 1 wherein said micro-organisms are gram-negative bacteria.

9. Dispersible powders of 1:2-benzisothiazolones of the formula

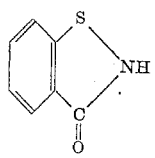

wherein R is selected from the group consisting of hydrogen and halogen in admixture with a substance selected from the group consisting of wetting and dispersing agents for use in the protection of aqueous media against infection by micro-organisms.

10. Dispersible powders as claimed in claim 9 wherein R stands for a hydrogen atom.

11. In a process for manufacturing paper, the improvement for controlling slime formation in aqueous paper-making media which comprises incorporating in said media, a slime-controlling amount of 1:2-benzisothiazolone, said amount being between 2 p.p.m. and 10 p.p.m. on the weight of water.

References Cited in the file of this patent

UNITED STATES PATENTS

| 1,962,109 | Alvord | June 5, 1934 |
| 2,870,015 | Allen et al. | Jan. 20, 1959 |
| 2,922,794 | Model et al. | Jan. 26, 1960 |
| 3,002,884 | Lo | Oct. 3, 1961 |

FOREIGN PATENTS

| 398,947 | Great Britain | Sept. 28, 1933 |

OTHER REFERENCES

Katz: C.A., 1947, vol. 51, page 6703i–6704d.